US009912535B2

(12) United States Patent
Ayanam et al.

(10) Patent No.: US 9,912,535 B2
(45) Date of Patent: Mar. 6, 2018

(54) SYSTEM AND METHOD OF PERFORMING HIGH AVAILABILITY CONFIGURATION AND VALIDATION OF VIRTUAL DESKTOP INFRASTRUCTURE (VDI)

(71) Applicant: AMERICAN MEGATRENDS, INC., Norcross, GA (US)

(72) Inventors: Varadachari Sudan Ayanam, Suwanee, GA (US); Venkatesaperumal Kondalsamy, Chennai (IN); David Yoon, Buford, GA (US); Santhosh Samuel Mathews, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 396 days.

(21) Appl. No.: 14/572,999

(22) Filed: Dec. 17, 2014

(65) Prior Publication Data

US 2016/0182284 A1     Jun. 23, 2016

(51) Int. Cl.
*G06F 15/177* (2006.01)
*H04L 12/24* (2006.01)
*G06F 9/455* (2018.01)
*G06F 9/44* (2018.01)

(52) U.S. Cl.
CPC ........ *H04L 41/0806* (2013.01); *G06F 9/4445* (2013.01); *G06F 9/45558* (2013.01); *H04L 41/12* (2013.01); *G06F 2009/45595* (2013.01)

(58) Field of Classification Search
CPC ............. G06F 13/4282; G06F 19/3481; G06F 9/45558; G06F 13/28; G06F 13/385; G06F 13/4022; G06F 2009/45595; G06F 19/3418; H04L 67/10; H04L 43/0876; H04L 69/22; H04L 41/0816; H04L 41/12; H04L 43/04;
(Continued)

(56) References Cited

U.S. PATENT DOCUMENTS 8,615,579 B1 *  12/2013  Vincent ................. G06F 9/4856
                                                                709/223
8,892,689 B1 *  11/2014  Mowry ................... H04L 41/12
                                                                709/219
(Continued)

*Primary Examiner* — Arvin Eskandarnia
*Assistant Examiner* — Thao Duong
(74) *Attorney, Agent, or Firm* — Locke Lord LLP; Tim Tingkang Xia, Esq.

(57) ABSTRACT

Certain aspects direct to system for performing high availability (HA) configuration and validation of virtual desktop infrastructure (VDI). The system includes a plurality of computing devices functioning as computing nodes, and a virtual desktop controller. Each computing device includes at least one network interface card (NIC), and each computing node includes at least one computing device. The virtual desktop controller includes a processor, a memory, and a storage device storing computer executable code. The code, when executed at the processor, is configured to: discover the computing devices; configure the NICs of the computing devices; configure hardware and software components of the computing devices; configure at least one cluster of the system, where each cluster includes at least one computing node; execute a hypervisor, and execute a plurality of virtual machines (VMs) on the executed hypervisor; and configure additional features related to the VMs of the system.

26 Claims, 8 Drawing Sheets

(58) Field of Classification Search
CPC ......... H04L 43/16; H04L 63/20; H04L 67/02; H04L 67/12
See application file for complete search history.

(56) References Cited

U.S. PATENT DOCUMENTS

| | | | |
|---|---|---|---|
| 2009/0222558 A1* | 9/2009 | Xu ........................... | G06F 9/485 709/224 |
| 2011/0276684 A1* | 11/2011 | Singh .................... | G06F 9/4856 709/224 |
| 2012/0239729 A1* | 9/2012 | Hefter ................... | G06F 9/4416 709/203 |
| 2015/0312104 A1* | 10/2015 | Riewrangboonya | G06F 9/45558 709/224 |

* cited by examiner

SYSTEM AND METHOD OF PERFORMING HIGH AVAILABILITY CONFIGURATION AND VALIDATION OF VIRTUAL DESKTOP INFRASTRUCTURE (VDI)

FIELD

The present disclosure relates generally to virtual desktop infrastructure (VDI) technology, and more particularly to systems and methods of performing high availability (HA) configuration and validation of VDI using a snap VDI manager (SVM) with memory arrays.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Virtual desktop infrastructure (VDI) is a desktop-centric service that hosts user desktop environments on remote servers or personal computers, which are accessed over a network using a remote display protocol. Typically, a system applying VDI technology may include multiple computing devices to perform different VDI related functions. Configuration of the multiple computing devices to perform these VDI related functions may be difficult.

Therefore, an unaddressed need exists in the art to address the aforementioned deficiencies and inadequacies.

SUMMARY

Certain aspects of the disclosure direct to a system for performing high availability (HA) configuration and validation of virtual desktop infrastructure (VDI). In certain embodiments, the system includes a plurality of computing devices and a virtual desktop controller communicatively connected to the computing device via a network. Each of the computing devices includes at least one network interface card (NIC). The virtual desktop controller includes a processor, a memory, and a storage device storing computer executable code. The code, when executed at the processor, is configured to: discover the computing devices; configure the NICs of the computing devices; configure hardware and software components of the computing devices; configure at least one cluster of the system, where each of the at least one cluster includes at least one of the computing devices; execute a hypervisor, and execute a plurality of virtual machines (VMs) on the executed hypervisor; and configure additional features related to the VMs of the system.

In certain embodiments, at least one of the computing devices is a virtual machine server storing the hypervisor and the plurality of VMs, where the virtual desktop controller is connected to the virtual machine server through an interface.

In certain embodiments, the code includes a snap VDI manager (SVM). In certain embodiments, the SVM includes: a data store storing information of the system, wherein the information of the system comprises discovery information and cluster configuration information; a discovery engine configured to discover the computing devices based on the discovery information; a configuration module configured to configure the NICs and the hardware and software components of the computing devices being discovered by the discovery engine, to configure the at least one cluster of the system based on the cluster configuration information, and to configure the additional features related to the VMs of the system; a VM control module configured to control the virtual machine server to execute the hypervisor and to execute the VMs on the executed hypervisor; a SVM monitor engine configured to monitor the hardware and software components of the computing devices and generate corresponding monitoring information, and to register the discovery information into the data store based on the corresponding monitoring information; and a user interface module for displaying the monitoring information on a display device.

In certain embodiments, for each of the computing devices, the discovery information comprises a protocol, a port number and an internet protocol (IP) address.

In certain embodiments, the configuration module is configured to configure the NICs of the computing devices by: for each of the computing devices comprising two or more of the NICs, performing NIC teaming to combine the two or more of the NICs to function as a single NIC.

In certain embodiments, the configuration module is configured to configure each of the at least one cluster of the system by: checking the data store for the cluster configuration information; when the cluster configuration information is stored in the data store, determining that a cluster role is installed, and collecting a domain credential from the cluster configuration information stored in the data store, wherein the domain credential comprises an internet protocol (IP) address for the cluster; receiving a cluster name for the cluster; selecting the at least one of the computing devices for the cluster; and validating the cluster. In certain embodiments, the configuration module is further configured to configure each of the at least one cluster of the system by: when the cluster configuration information is not stored in the database, determining that the cluster role is not installed, and installing the cluster role to generate the cluster configuration information in the data store.

In certain embodiments, the VM control module is configured to control the virtual machine server to execute the VMs on the executed hypervisor by: launching a random access memory (RAM) disk on a volatile memory array using a RAM disk driver; deploying the VMs to the RAM disk; and executing the VMs from the RAM disk.

In certain embodiments, the SVM monitor engine is further configured to monitor the RAM disk.

In certain embodiments, at least one of the computing devices is a thin client computing device.

In certain embodiments, the additional features related to the VMs of the system may include HA failover features and alert features.

Certain aspects of the disclosure direct to a method of performing HA configuration and validation of VDI. In certain embodiments, the method includes: discovering, by a snap VDI manager (SVM) executed at a processor of a virtual desktop controller, a plurality of computing devices of a VDI system, wherein the virtual desktop controller is communicatively connected to the computing devices via a network, and wherein each of the computing devices comprises at least one network interface card (NIC); configuring, by the executed SVM, the NICs of the computing devices; configuring, by the executed SVM, hardware and software components of the computing devices; configuring, by the executed SVM, at least one cluster of the VDI system, wherein each of the at least one cluster comprises at least one of the computing devices; executing, by the executed SVM, a hypervisor, and executing a plurality of virtual machines (VMs) on the executed hypervisor; and configuring, by the executed SVM, additional features related to the VMs of the VDI system.

In certain embodiments, at least one of the computing devices is a virtual machine server storing the hypervisor and the plurality of VMs, where the virtual desktop controller is connected to the virtual machine server through an interface.

In certain embodiments, the SVM includes: a data store storing information of the system, wherein the information of the system comprises discovery information and cluster configuration information; a discovery engine configured to discover the computing devices based on the discovery information; a configuration module configured to configure the NICs and the hardware and software components of the computing devices being discovered by the discovery engine, to configure the at least one cluster of the system based on the cluster configuration information, and to configure the additional features related to the VMs of the VDI system; a VM control module configured to control the virtual machine server to execute the hypervisor and to execute the VMs on the executed hypervisor; a SVM monitor engine configured to monitor the hardware and software components of the computing devices and generate corresponding monitoring information, and to register the discovery information into the data store based on the corresponding monitoring information; and a user interface module for displaying the monitoring information on a display device.

In certain embodiments, for each of the computing devices, the discovery information comprises a protocol, a port number and an IP address.

In certain embodiments, the configuration module is configured to configure the NICs of the computing devices by: for each of the computing devices comprising two or more of the NICs, performing NIC teaming to combine the two or more of the NICs to function as a single NIC.

In certain embodiments, the configuration module is configured to configure each of the at least one cluster of the system by: checking the data store for the cluster configuration information; when the cluster configuration information is stored in the data store, determining that a cluster role is installed, and collecting a domain credential from the cluster configuration information stored in the data store, wherein the domain credential comprises an IP address for the cluster; receiving a cluster name for the cluster; selecting the at least one of the computing devices for the cluster; and validating the cluster. In certain embodiments, the configuration module is further configured to configure each of the at least one cluster of the system by: when the cluster configuration information is not stored in the database, determining that the cluster role is not installed, and installing the cluster role to generate the cluster configuration information in the data store.

In certain embodiments, the VM control module is configured to control the virtual machine server to execute the VMs on the executed hypervisor by: launching a random access memory (RAM) disk on a volatile memory array using a RAM disk driver; deploying the VMs to the RAM disk; and executing the VMs from the RAM disk.

In certain embodiments, the SVM monitor engine is further configured to monitor the RAM disk.

In certain embodiments, at least one of the computing devices is a thin client computing device.

In certain embodiments, the additional features related to the VMs of the system may include HA failover features and alert features.

Certain aspects of the disclosure direct to a non-transitory computer readable medium storing computer executable code. In certain embodiments, the code, when executed at a processor of a virtual desktop controller, is configured to: discover a plurality of computing devices of a VDI system, wherein the virtual desktop controller is communicatively connected to the computing devices via a network, and wherein each of the computing devices comprises at least one NIC; configure the NICs of the computing devices; configure hardware and software components of the computing devices; configure at least one cluster of the VDI system, wherein each of the at least one cluster comprises at least one of the computing devices; execute a hypervisor, and executing a plurality of VMs on the executed hypervisor; and configure additional features related to the VMs of the VDI system.

In certain embodiments, at least one of the computing devices is a virtual machine server storing the hypervisor and the plurality of VMs, where the virtual desktop controller is connected to the virtual machine server through an interface.

In certain embodiments, the SVM includes: a data store storing information of the system, wherein the information of the system comprises discovery information and cluster configuration information; a discovery engine configured to discover the computing devices based on the discovery information; a configuration module configured to configure the NICs and the hardware and software components of the computing devices being discovered by the discovery engine, to configure the at least one cluster of the system based on the cluster configuration information, and to configure the additional features related to the VMs of the VDI system; a VM control module configured to control the virtual machine server to execute the hypervisor and to execute the VMs on the executed hypervisor; a SVM monitor engine configured to monitor the hardware and software components of the computing devices and generate corresponding monitoring information, and to register the discovery information into the data store based on the corresponding monitoring information; and a user interface module for displaying the monitoring information on a display device.

In certain embodiments, for each of the computing devices, the discovery information comprises a protocol, a port number and an IP address.

In certain embodiments, the configuration module is configured to configure the NICs of the computing devices by: for each of the computing devices comprising two or more of the NICs, performing NIC teaming to combine the two or more of the NICs to function as a single NIC.

In certain embodiments, the configuration module is configured to configure each of the at least one cluster of the system by: checking the data store for the cluster configuration information; when the cluster configuration information is stored in the data store, determining that a cluster role is installed, and collecting a domain credential from the cluster configuration information stored in the data store, wherein the domain credential comprises an IP address for the cluster; receiving a cluster name for the cluster; selecting the at least one of the computing devices for the cluster; and validating the cluster. In certain embodiments, the configuration module is further configured to configure each of the at least one cluster of the system by: when the cluster configuration information is not stored in the database, determining that the cluster role is not installed, and installing the cluster role to generate the cluster configuration information in the data store.

In certain embodiments, the VM control module is configured to control the virtual machine server to execute the VMs on the executed hypervisor by: launching a random access memory (RAM) disk on a volatile memory array using a RAM disk driver; deploying the VMs to the RAM disk; and executing the VMs from the RAM disk.

In certain embodiments, the SVM monitor engine is further configured to monitor the RAM disk.

In certain embodiments, at least one of the computing devices is a thin client computing device.

In certain embodiments, the additional features related to the VMs of the system may include HA failover features and alert features.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
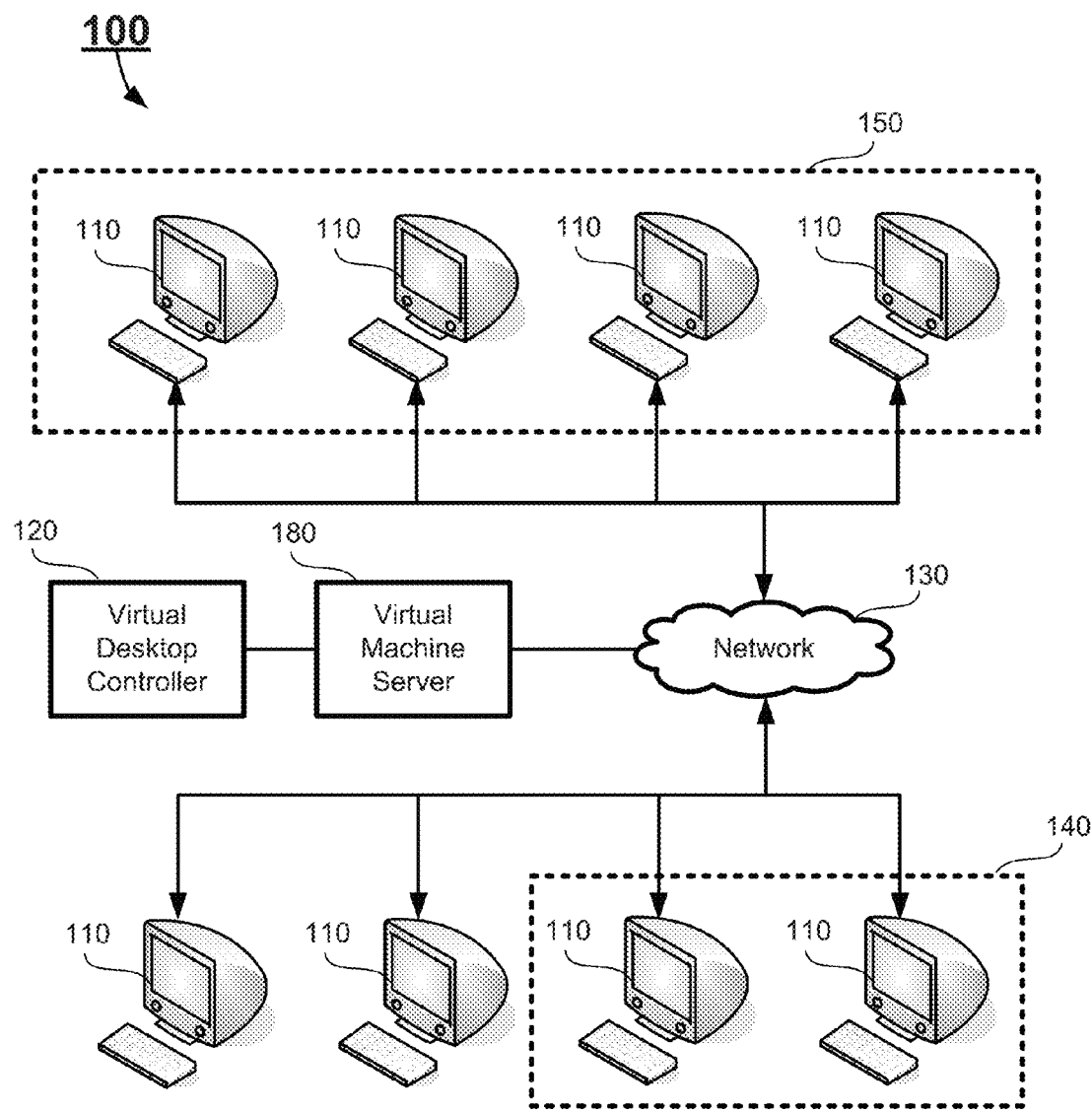
FIG. 1 schematically depicts a HA VDI system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an IP address.

The term "cluster", as used herein, generally refers to a set of loosely or tightly connected computing devices (or more precisely, computing nodes) that work together such that, in many respects, they can be viewed as a single system. The components of a cluster are usually connected to each other through a network, with each node of the cluster being set to perform certain tasks.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

One aspect of the present disclosure is directed to a system of performing HA configuration and validation of VDI using a SVM with memory arrays. As discussed above, VDI is a desktop-centric service that hosts user desktop environments on remote servers or personal computers, which are accessed over a network using a remote display protocol. In certain embodiments, the SVM is used to discover the configured IP using windows management instrumentation (WMI) request and response, and to monitor and manage the virtual media server.

FIG. 1 schematically depicts a HA VDI system according to certain embodiments of the present disclosure. The system 100 is capable of performing HA configuration and validation under the VDI. As shown in FIG. 1, the system 100 includes a plurality of computing devices 110 and a virtual desktop controller 120. One of the computing devices 110 is a virtual machine server 180, which is connected to the virtual desktop controller 120. The virtual desktop controller 120 is communicatively connected to the computing devices 110 via a network 130. The network 130 may be a wired or wireless network, and may be of various forms, such as a public network and a private network. Examples of the network 130 may include, but not limited to, a local area network (LAN) or wide area network (WAN) including the Internet. In certain embodiments, two or more different networks 130 may be applied to connect the computing devices 110 and the virtual desktop controller 120. In certain embodiments, the system 100 may include three types of network 130: a heartbeat network, the Internet, and a virtual machine network. The use of the different types of network may be described in details later.

Figure 2A:
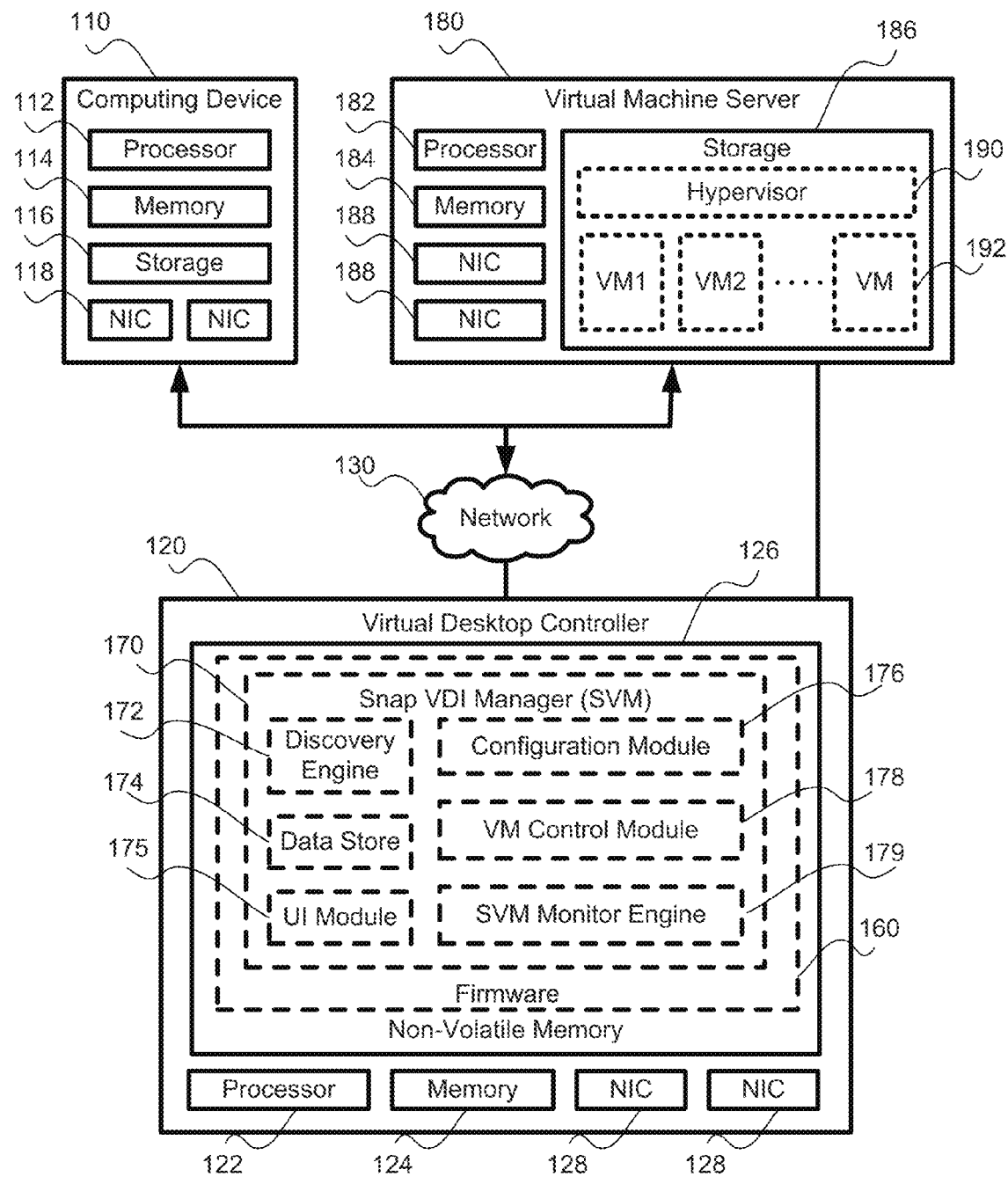
FIG. 2A schematically depicts a HA VDI system according to certain embodiments of the present disclosure.

FIG. 2A schematically depicts a HA VDI system according to certain embodiments of the present disclosure. Specifically, FIG. 2A shows a part of the system 100, which includes the virtual desktop server 120, the virtual machine server 180, the network 130 and one computing device 110.

Each of the computing devices 110 may be a general purpose computer server system or a headless server. Examples of the computing devices 110 may include, but not limited to, the virtual machine server 180, a thin client computing device, or any other server or computing device for the system 100. In certain embodiments, the computing devices 110 function as a plurality of computing nodes, where each of the computing nodes comprises one of the computing devices 110. The configuration of the computing nodes of the system 100 may be predetermined. Further, the computing nodes of the system 100 may be further configured to form at least one cluster. For example, FIG. 1 shows a cluster 140 which includes two of the computing devices 110, and a cluster 150 which includes four of the computing devices 110. Since each of the computing devices in the clusters 140 and 150 functions as a single computing node, the cluster 140 includes two computing nodes, and the cluster 150 includes four computing nodes. The configuration of the clusters of the system 100 may be predetermined. In certain embodiments, the administrator of the system 100 may change the configuration of any of the clusters of the system 100.

Each of the computing devices 110 may include necessary hardware and software components to perform certain predetermined tasks. For example, as shown in FIG. 2A, the computing device 110 includes a processor 112, a memory 114, a storage 116 and two network interface cards (NICs) 118. Further, the computing device 110 may include other hardware components and software components (not shown) to perform its corresponding tasks. Examples of these hardware and software components may include, but not limited to, other required memory, interfaces, buses, Input/Output (I/O) modules and peripheral devices.

The processor 112 is configured to control operation of the computing device 110. In certain embodiments, the processor 112 may be a central processing unit (CPU). The processor 112 can execute any computer executable code or instructions, such as an operating system (OS) or other applications of the computing device 110. In certain embodiments, the computing device 110 may run on more than one processor, such as two processors, four processors, eight processors, or any suitable number of processors.

The memory 114 can be a volatile memory, such as the random-access memory (RAM), for storing the data and information during the operation of the computing device 110.

The storage 116 is a non-volatile data storage media for storing the applications of the computing device 110. Examples of the storage 116 may include flash memory, memory cards, USB drives, hard drives, floppy disks, optical drives, or any other types of data storage devices.

The NICs 118, sometimes referred to as network interface controllers, are computer hardware components that connect the computing device 110 to the network 130. As shown in FIG. 2A, the computing device 110 includes two NICs 118. In certain embodiments, each of the computing devices 110 may include at least one NIC 118. For example, when the system 100 includes multiple networks 130, the computing device 110 may require multiple NICs 118, such that the computing device 110 may be connected to each of the networks 130 via each of the NICs 118. In certain embodiments, the number of the NICs 118 of the computing device 110 may be determined based on the types of network being provided in the system 100. For example, as discussed above, the system 100 may include three types of network 130: a heartbeat network, the Internet, and a virtual machine network. In this case, the computing device 110 may include three NICs 118, and each NIC 118 is configured to perform network communicate with one of the three types of network 130.

The virtual machine server 180 is a computing device which serves as a server for providing virtual machine services for the system 100. As shown in FIG. 2A, the virtual machine server 180 includes a processor 182, a memory 184, a storage 186 and two NICs 188. Further, the storage 186 of the virtual machine server 180 stores a hypervisor 190 and a plurality of VMs 192. Details of the processor 182, the memory 184, the storage 186 and the NICs 188 have been described above and are not hereinafter further elaborated.

The hypervisor 190 is a program that allows multiple VM instances to run simultaneously and share a single hardware host, such as the virtual machine server 180. The hypervisor 190, when executed at the processor 182 of the virtual machine server 180 or any other processor, implements hardware virtualization techniques and allows one or more operating systems or other applications to run concurrently as guests of one or more virtual machines on the host server (i.e., the virtual machine server 180). For example, a plurality of users, each from one of the thin clients (e.g., the computing device 110), may attempt to run operating systems in the system 100. The hypervisor 190 allows each user to run an operating system instance as a VM. In certain embodiments, the hypervisor 190 can be of various types and designs, such as MICROSOFT HYPER-V, XEN, VMWARE ESX, or other types of hypervisors suitable for the iVDI system 100.

Figure 2B:
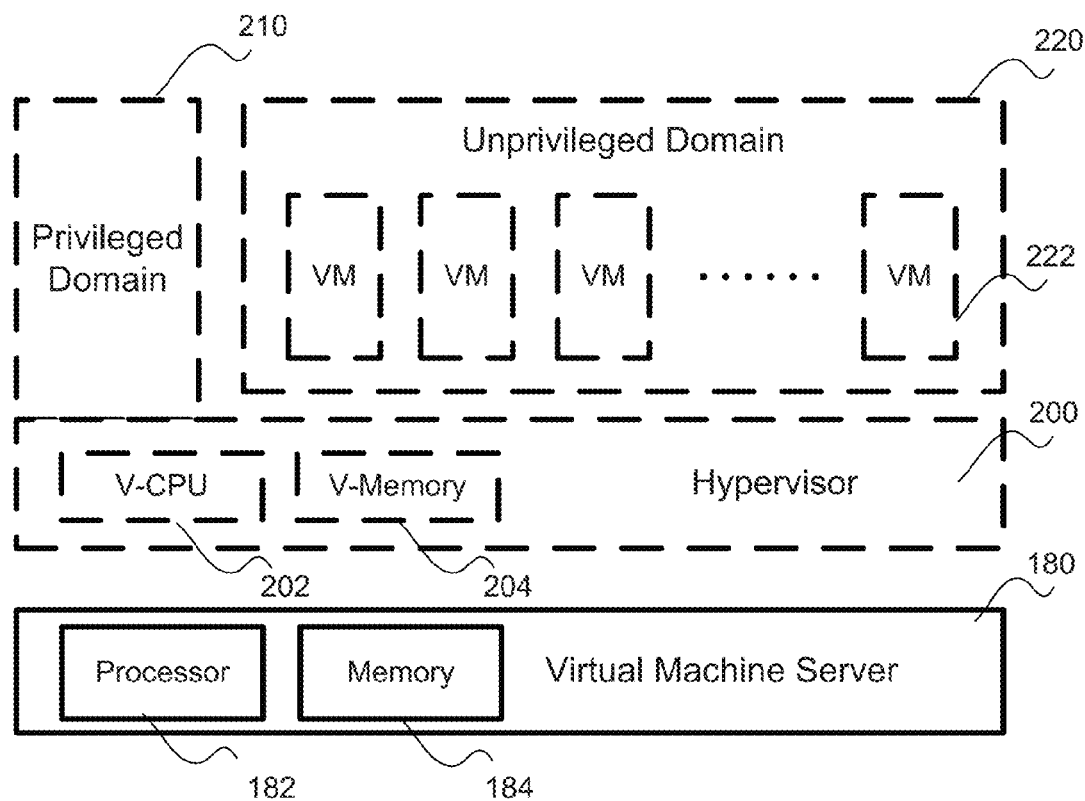
FIG. 2B schematically depicts the execution of the VMs on the system according to certain embodiments of the present disclosure.

FIG. 2B schematically depicts the execution of the VM's on the system according to certain embodiments of the present disclosure. As shown in FIG. 2B, when the hypervisor instance 200 runs on the virtual machine server 180, the hypervisor 200 emulates a virtual computer machine, including a virtual CPU 202 and a virtual memory 204. The hypervisor 200 also emulates a plurality of domains, including a privileged domain 210 and an unprivileged domain 220 for the VM. A plurality of VM's 222 can run in the unprivileged domain 220 of the hypervisor 200 as if they are running directly on a physical computer.

Referring back to FIG. 2A, the virtual desktop controller 120 is a controller to control the configuration and validation of the components of the system 100. In certain embodiments, the virtual desktop controller 120 may be implemented by a service processor (SP) or a baseboard management controller (BMC), which may be located in one of the computing devices 110, such as the virtual machine server 180. The SP or the BMC is a specialized microcontroller that manages the interface between system management software and platform hardware. Different types of sensors may be built into a host computer where the SP/BMC is located (e.g., the virtual machine server 180), and the SP/BMC may reads these sensors to obtain parameters such as temperature, cooling fan speeds, power status, operating system status, etc. The SP/BMC may be configured to monitor the sensors and may send out-of-band (OOB) alerts to a system administrator of the host computer if any of the parameters do not stay within preset limits, indicating a potential failure of the host computer. In certain embodiments, the administrator may also remotely communicate with the SP/BMC from any of the computing devices 110 via the network 130 to take remote action to the host computer. For example, when the SP/BMC is located in the virtual machine server 180, the administrator may reset the virtual machine server 180 from any of the computing device 110 through the SP/BMC, and may obtain system information of the virtual machine server 180 OOB without interrupting the operation of the virtual machine server 180.

In certain embodiments, the system 100 may include other components such that the SP/BMC may be configured to monitor these components. For example, the system 100 may include a plurality of physical disks, which may be used to form a storage pool to a clustered shared volume (CSV) of the system 100 to function as a backup node of one of the clusters 140 or 150. The CSV is a shared disk containing a volume that is made accessible for read and write operations by all nodes within a cluster. In certain embodiments, the physical disks may be Just a Bunch of Disks (JBOD), which are hard disks not configured according to the redundant array of independent disks (RAID). In certain embodiments, the JBOD may be implemented under any computer storage protocols, such as the serial attached SCSI (SAS) protocol. In this case, different types of sensors may be built into the JBOD, and the SP/BMC may reads these sensors to obtain parameters of the JBOD, such as temperature, cooling fan speeds, power status, operating system status, etc. Thus, the administrator may obtain system information of the JBOD OOB via the WMI without interrupting the operation of the virtual machine server 180.

It should be noted that the virtual desktop controller 120 is not necessary implemented by the SP/BMC as shown in FIG. 2A. In certain embodiments, the virtual desktop controller 120 may be implemented in one or more of the computing devices 110 as a part of the computing device 110. For example, the virtual desktop controller 120 may be implemented in the virtual machine server 180 and other servers of the system 100. In this case, the virtual desktop controller 120 may share the hardware and software components of the servers with other software components of the servers to perform certain predetermined tasks. In certain embodiments, the virtual desktop controller 120 may be implemented as a virtual machine within the virtual machine server 180 by one of the VMs 192. In certain embodiments, the virtual desktop controller 120 may be implemented by a separate computing device 110, which is independent from and not included in any of the servers or computing devices 110 of the system 100.

When the virtual desktop controller 120 is implemented as an independent SP/BMC, the virtual desktop controller 120 may include necessary hardware and software components to perform certain predetermined tasks. For example, as shown in FIG. 2A, the virtual desktop controller 120 includes a processor 122, a memory 124, a non-volatile memory 126 and two NICs 128. Further, the virtual desktop controller 120 may include other hardware components and software components (not shown) to perform its corresponding tasks. Examples of these hardware and software components may include, but not limited to, other required memory, interfaces, buses, I/O modules and peripheral devices.

The processor 122 is configured to control operation of the virtual desktop controller 120. In certain embodiments, the processor 122 may be a central processing unit (CPU). The processor 122 can execute any computer executable code or instructions, such as the firmware or other applications of the virtual desktop controller 120. In certain embodiments, the virtual desktop controller 120 may run on more than one processor, such as two processors, four processors, eight processors, or any suitable number of processors.

The memory 124 can be a volatile memory, such as the random-access memory (RAM), for storing the data and information during the operation of the virtual desktop controller 120.

The NICs 128 are computer hardware components that connect the virtual desktop controller 120 to the network 130. As shown in FIG. 2A, the virtual desktop controller 120 includes two NICs 128. As described above, For example, when the system 100 includes multiple networks 130, the virtual desktop controller 120 may require multiple NICs 128, such that the virtual desktop controller 120 may be connected to each of the networks 130 via each of the NICs 128. In certain embodiments, the number of the NICs 128 of the virtual desktop controller 120 may be determined based on the types of network being provided in the system 100. For example, as discussed above, the system 100 may include three types of network 130: a heartbeat network, the Internet, and a virtual machine network. In this case, the virtual desktop controller 120 may include three NICs 128, and each NIC 128 is configured to perform network communicate with one of the three types of network 130.

The non-volatile memory 126 is a non-volatile data storage media for storing the firmware 160 and other computer executable code of the virtual desktop controller 120. Examples of the non-volatile memory 126 may include flash memory, memory cards, USB drives, hard drives, floppy disks, optical drives, or any other types of non-volatile data storage devices. The firmware 160 stored in the non-volatile memory 126 includes computer executable code that may be executed at the processor 122. As shown in FIG. 2A, the firmware 160 includes a snap VDI manager (SVM) 170, which includes multiple modules to perform different functions. As shown in FIG. 2A, the SVM 170 includes a discovery engine 172, a data store 174, a user interface (UI) module 175, a configuration module 176, a VM control module 178, and a SVM monitor engine 179.

The discovery engine 172 configured to perform discovery of the computing devices 110 and their hardware and software components. In certain embodiments, the discovery of the computing devices 110 is performed based on discovery information stored in the data store. In certain embodiments, the discovery information may include a protocol, a port number and an internet protocol (IP) address. It should be noted that the computing devices 110 of the system 100 may be added to the system 100 at different period of time. For example, each of the computing devices 110 may be turned on at a different time. Thus, the discovery engine 172 may constantly perform the discovery process to ensure that the discovery engine 172 discovers all of the computing devices 110 of the system 100. In certain embodiments, the discovery engine 172 may perform periodic polling of the computing devices 110 with a predetermined time interval. For example, the discovery engine 172 may perform polling every one minute to attempt to discover one or more computing devices 110 that were not previously discovered.

The data store 174 is a database for storing information of the system 100. The information of the system 100 may include the discovery information as described above, and configuration information of the system. Examples of the configuration information may include, but not limited to, computing device configuration information, cluster configuration information, VM configuration information, random access memory (RAM) disk configuration information, HA failover configuration information, alert configuration information, or any other information related to configuration of the components of the system 100.

The UI module 175 provides a UI available to a user of the virtual desktop controller 120 such that the user, through the UI, may input commands and instructions to the virtual desktop controller 120 or receive information from the virtual desktop controller 120. Generally, the user of the virtual desktop controller 120 may be an administrator or an end user of the system 100. In some occasions, the UI provided by the UI module 175 may be a web-based graphical user interface (GUI), which is capable of being displayed on a display device (not shown) of the system 100 such that the user may perform operation and receive the information through the web-based GUI. In certain embodiments, the UI module 175 may provide other types of UI, such as a text-based interface, a voice operated interface, etc. In certain embodiments, the information being provided by the virtual desktop controller 120 and displayed by the UI to the user may include monitoring information of the system 100.

The configuration module 176 is a core module of the SVM 170 to perform configuration of all components of the system 100. For example, the configuration module 176 may configure the computing devices 110 being discovered by the discovery engine 172 based on the computing device configuration information. In certain embodiments, the configuration of each of the computing devices 110 generally relates to configuration of the NICs 118 and the hardware and software components of the computing device 110. Further, the configuration module 176 may configure the clusters of the system 100 based on the cluster configuration information. Further, the configuration module 176 may configure the VMs of the virtual machine server 180 based on the VM configuration information and the RAM disk configuration information, and may configure additional features related to the VMs of the system 100, such as HA failover features or alert features. Details of the configurations will be hereinafter described.

In certain embodiments, the configuration of the hardware and software components of the computing device 110 may include configuration of the processor 112, the memory 114, the storage 116, and the software components stored in the storage 116. For example, for the cluster 140 having two computing devices 110 as shown in FIG. 1, the configuration module 176 may configure the computing devices 110 of the cluster 140 by configuring the processor 112, the memory 114, the storage 116, and the software components stored in the storage 116 on each of the computing devices 110. In certain embodiments, to configure the memory 114 of each of the computing devices 110 of the cluster 140, the configuration module 176 may compare the memory 114 of the computing devices 110 to ensure that the memory 114 matches one another. If one memory 114 is different from the other memory 114, the configuration module 176 will determine that the memory 114 is mismatched, and then use the minimum available memory on all of the computing devices 110 of the cluster 140. For example, if the size of one memory 114 of one computing device 110 is 256 GB and the size of the other memory 114 of the other computing device 110 is 512 GB, the configuration module 176 may use only 256 GB of each of the memory 114 such that the memory 114 of the cluster is matched. Similarly, to configure the processor 112 of each of the computing devices 110 of the cluster 140, the configuration module 176 may compare the processors 112 to ensure the processors 112 are compatible to one another. If the processors 112 are mismatched or incompatible, the configuration module 176 may control the SVM monitor engine 179 to generate a warning message. Similarly, to configure the storage 116 of each of the computing devices 110 of the cluster 140, the configuration module 176 may compare the storages 116 to ensure that all storages 116 may be accessible by all of the nodes in the cluster, and to validate the number of the storages 116 available such that storage mirroring and tiering may be performed. In certain embodiments, a cluster 140 may need a minimum of 4 hard disks to create a mirrored storage pool. In certain embodiments, to perform storage tiering, the cluster 140 may need different classes of hard disks, such as SSDs and/or SCSI hard disks. Further, to configure the software components of each of the computing devices 110 of the cluster 140, the configuration module 176 may compare all software components to ensure that the versions of all the required software components should match. If one or more of the software components are mismatched or incompatible, the configuration module 176 may control the SVM monitor engine 179 to generate a warning message.

The VM control module 178 is configured to control the virtual machine server 180 to execute the hypervisor 190 and to execute the VMs 192 on the executed hypervisor 180. Generally, the VM control module 178 operates together with the configuration module 176 such that the executed VMs 192 may be properly configured.

The SVM monitor engine 179 is a monitoring module configured to monitor the hardware and software components of the computing devices 110 and generate corresponding monitoring information of the computing devices 110 based on the monitoring process. When the SVM monitor engine 179 monitors the computing devices 110 and detects that one of the computing devices 110 has a component that is changed, the SVM monitor engine 179 may register the discovery information related to the component of the computing device 110 into the data store 174 based on the corresponding monitoring information being detected.

Figure 3:
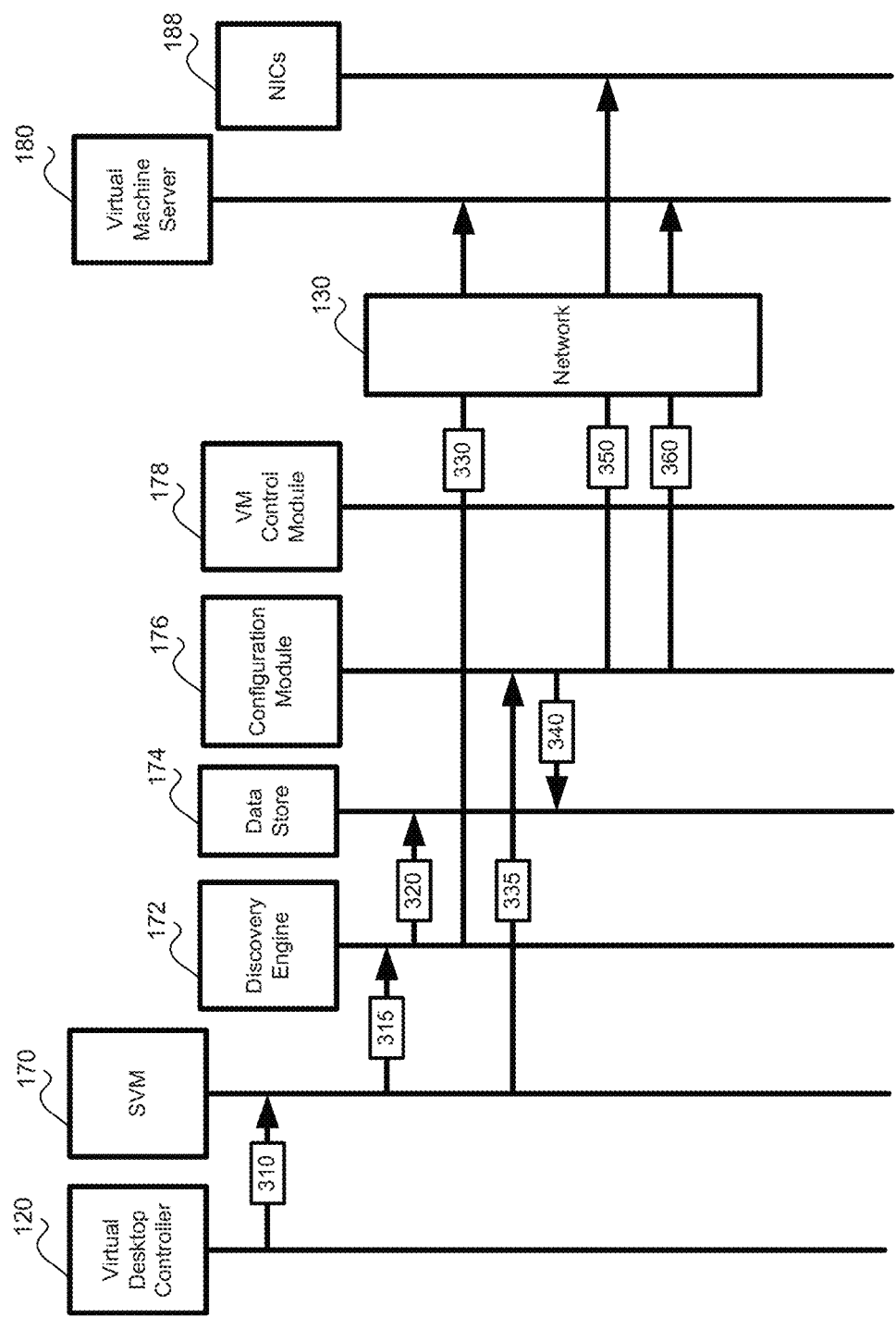
FIG. 3 schematically depicts the discovery and configuration processes of the virtual machine server by the SVM according to certain embodiments of the present disclosure.

FIG. 3 schematically depicts the discovery and configuration processes of the virtual machine server by the SVM according to certain embodiments of the present disclosure. In this embodiment, the virtual desktop controller 120 is independent from the virtual machine server 180. Thus, when the virtual desktop controller 120 is initiated, the virtual desktop controller 120 needs to discover the virtual machine server 180 before performing configuration of the virtual machine server 180.

At procedure 310, when the virtual desktop controller 120 is initiated, the virtual desktop controller 120 executes the SVM 170. At procedure 315, the SVM 170 calls the discovery engine 172 to perform the discovery process. At procedure 320, the discovery engine 172 retrieves the discovery information of all computing devices 110, including the virtual machine server 180, from the data store 174. In certain embodiments, the discovery information of the virtual machine server 180 may include a protocol, a port number and an IP address of the virtual machine server 180.

At procedure 330, the discovery engine 172, based on the retrieved discovery information, performs polling of the computing devices 110, and discovers the virtual machine server 180. As discussed above, the discovery engine 172 may perform periodic polling of the computing devices 110 with a predetermined time interval (for example, every one minute). It should be noted that, for each polling process performed by the discovery engine 172, one or more of the computing devices 110 may be discovered. In other words, although FIG. 3 shows that the discovery engine 172 discovers only the virtual machine server 180, the discovery engine 172 may discover the virtual machine server 180 together with other computing devices 110 in a polling process. In certain embodiments, when the discovery engine 172 discovers the virtual machine server 180 (or any other server) of the system 100, the discovery engine 172 may send the corresponding discovery information to the UI module 175 (not shown in FIG. 3), such that the UI module 175 generates a message through the UI to the user notifying the user of the discovery of the virtual machine server 180, and requesting from the user a log-in credential for the virtual machine server 180. Once the user inputs the log-in credential for the virtual machine server 180 through the UI, the discovery engine 172 may log in the virtual machine server 180 using the credential. In certain embodiments, during the discovery procedure 330 of the virtual machine server 180, the SVM monitor engine 179 (not shown in FIG. 3) may monitor the discovery and register the discovery information related to the virtual machine server 180 into the data store 174 based on the corresponding monitoring information being detected during the discovery procedure 330.

At procedure 335, once the discovery process of the virtual machine server 180 is complete, the SVM calls for the configuration module 176 to perform configuration of the virtual machine server 180. At procedure 340, the configuration module 176 retrieves the configuration information of the virtual machine server 180 from the data store 174.

At procedure 350, the configuration module 176, based on the configuration information of the virtual machine server 180, performs configuration to the NICs 188 of the virtual machine server 180. The reason to perform configuration of the NICs 188 before other hardware and software components is to ensure that the virtual machine server 180 becomes available to the network 130 (or the multiple networks) of the system 100. Further, once a cluster is created and the NICs 188 are added to the cluster, the configuration of the NICs 188 may not be further modified. Thus, the configuration of the NICs 188 needs to be performed before other hardware and software components and the cluster configuration. In certain embodiments, when the configuration module 176 is performing configuration for other computing devices 110, the configuration module 176 will also configure the NICs 118 of the computing devices 110 before configuring other components of the computing devices 110.

In certain embodiments, the SVM gives seamless support to configure the NICs in a "teaming" combination. Such a combination is generally referred to as NIC teaming, which is also known as load balancing and failover (LBFO). NIC teaming allows bandwidth aggregation of the NICs, which may improve bandwidth of the virtual machine server. Further, NIC teaming may provide the failover of the network by switching over the NICs based on the failure condition. For example, when NIC teaming is performed to the NICs 188 of the virtual machine server 180, if one of the NICs 188 fails, the other NIC 188 in the NIC teaming may take over to perform network communication for the virtual machine server 180. In certain embodiments, for each of the computing devices 110 including multiple NICs 118, the configuration module 176 is configured to configure the NICs of the computing device 110 by performing NIC teaming to combine the multiple NICs 118 to function as a single NIC. For example, as shown in FIG. 2A, the virtual machine server 180 has two NICs 188. Thus, at procedure 350, the configuration module 176 may perform NIC teaming to combine the two NICs 188 of the virtual machine server 180 to function as a single NIC.

Once the configuration of the NICs 188 is complete, at procedure 360, the configuration module 176, based on the configuration information of the virtual machine server 180, performs configuration to other hardware and software components of the virtual machine server 180.

During the discovery and configuration procedures, if the SVM monitor engine 179 detects any error in any of the procedures, the SVM monitor engine 179 may control the UI module 175 to display the monitoring information to the user through the UI. Specifically, the UI module may generate an error message related to the detected errors based on the monitoring information, and display the error message to the user through the UI.

Figure 4:
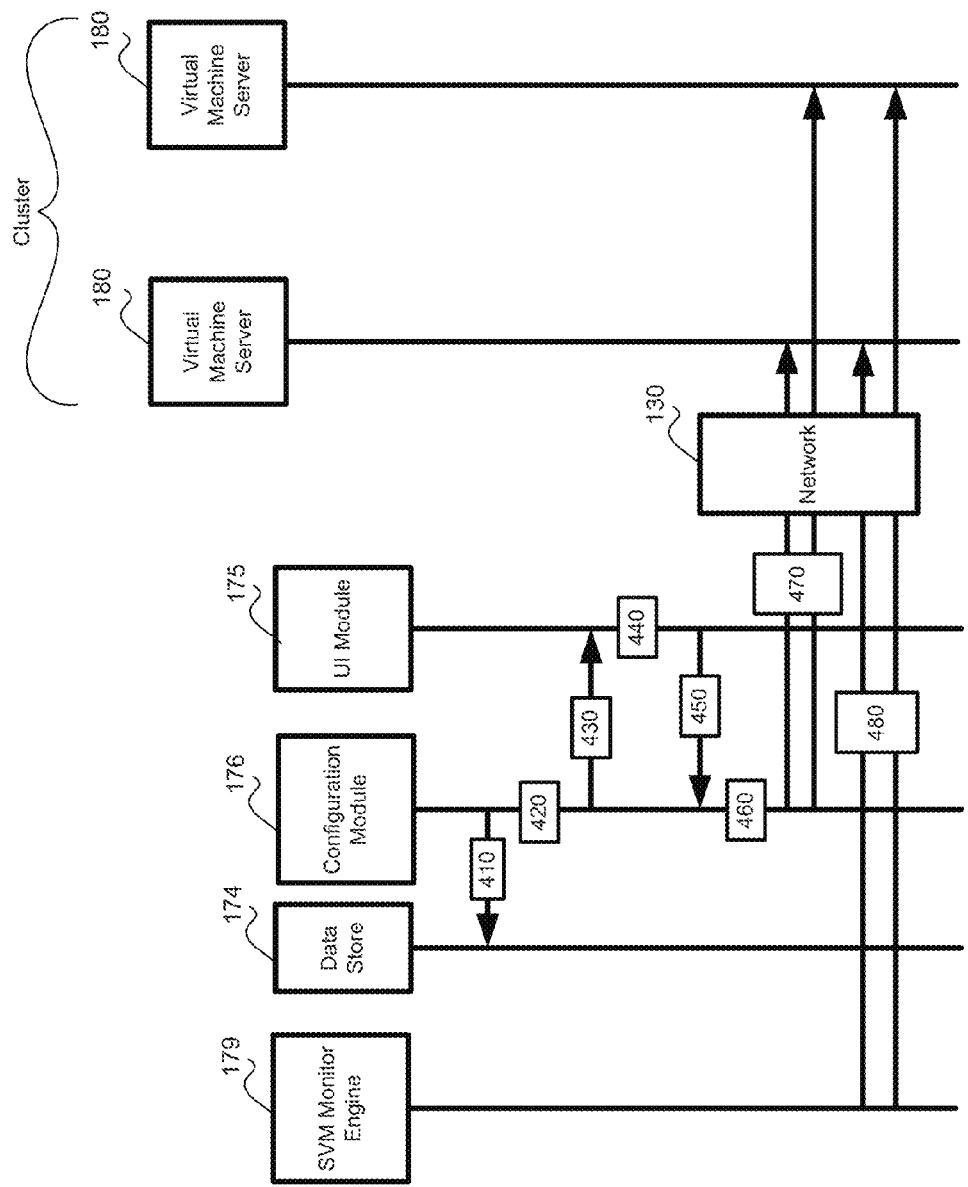
FIG. 4 schematically depicts the configuration process of a cluster having two virtual machine servers by the SVM according to certain embodiments of the present disclosure.

FIG. 4 schematically depicts the configuration process of a cluster having two virtual machine servers by the SVM according to certain embodiments of the present disclosure. In this embodiment, the system 100 includes two virtual machine servers 180, which are included in one cluster, and the virtual desktop controller 120 is independent from the virtual machine servers 180. Since each of the virtual machine servers 180 is a computing device 110, the virtual desktop controller 120 may perform discovery and configuration of each of the virtual machine servers 180 as shown in FIG. 3.

At procedure 410, the configuration module 176 retrieves the cluster configuration information of the virtual machine servers 180 from the data store 174. It should be noted that the cluster configuration information may or may not exist in the data store 174. For example, if a cluster role has been previously installed, the cluster configuration information related to the cluster role may be stored in the data store 174. If no cluster role was installed, the data store 174 may have no cluster configuration information stored therein.

If a cluster role has been previously installed, the cluster configuration information is stored in the data store 174. Thus, at procedure 420, when the configuration module 176 successfully retrieves the cluster configuration information from the data store 174, the configuration module 176 will determine that a cluster role has been installed. Then the configuration module 176 collects a domain credential from the cluster configuration information. In certain embodiments, the domain credential may include an IP address for the cluster.

Alternatively, if a cluster role has not been installed, the data store 174 does not store the cluster configuration information. Thus, at procedure 420, when the configuration module 176 does not retrieve the cluster configuration information from the data store 174, the configuration module 176 will determine that a cluster role has not been installed. Then the configuration module 176 may install the cluster role to generate the cluster configuration information in the data store 174. In this case, the user may be required to input certain information related to the cluster to generate the cluster configuration information.

At procedure 430, the configuration module 176 may send a command to the UI module 175, such that the UI module 175 generates a message through the UI to the user notifying the user to input certain information related to the cluster. The information related to the cluster may include a cluster name, a static IP address assigned for the cluster, or any other configuration information related to the cluster. In certain embodiments, a dynamic host configuration protocol (DHCP) service may be provided to automatically set an IP address for the cluster. In this case, there is no need for the user to assign the IP address or to obtain the IP address of the cluster from the cluster configuration information. At procedure 440, the user inputs the information to the cluster through the UI. At procedure 450, the UI module 175 sends the information to the cluster to the configuration module 176 for processing.

At procedure 460, the configuration module 176 may select the computing devices 110 for the cluster. In certain embodiments, a list of the computing devices 110 may be stored in the data store 174, and the configuration module 176 may retrieve the list of the computing device 110 for the selection of the computing devices for the cluster. In this case, the cluster includes the two virtual machine servers 180. Thus, the configuration module 176 selects the two virtual machine servers 180 to create the cluster, and configure the two virtual machine servers 180.

At procedure 470, the configuration module 176 validates the cluster by performing a plurality of validation cluster configuration tests to the cluster (i.e. the two virtual machine servers 180). In certain embodiments, the validation cluster configuration tests may include, but not limited to, inventory tests, network tests, storage tests, and system configuration tests.

During the validation cluster configuration tests, at procedure 480, the SVM monitor engine 179 starts monitoring the cluster (i.e. the two virtual machine servers 180). If the SVM monitor engine 179 detects any error in any of the validation cluster configuration tests, the SVM monitor engine 179 may control the UI module 175 to display the monitoring information to the user through the UI. Specifically, the UI module 175 may generate an error message related to the detected errors based on the monitoring information, and display the error message to the user through the UI. Thus, the user may determine the issues of the cluster based on the error message, and perform corresponding solutions to resolve the issues.

In certain embodiments, when the VM control module 178 controls the virtual machine server to execute the hypervisor and to execute the VMs on the executed hypervisor, a RAM disk is used to run the VMs. The RAM disk, sometimes referred to as a RAM drive, is a memory-emulated virtualized storage that may be used to store the VM image data. Data access to the RAM disk is generally 50-100 times faster than data access to a physical nonvolatile storage, such as a hard drive. Thus, using the RAM disk as the storage for the VM image data allows the data access to the VM images to speed up, which reduces the bootstorm problem for the VDI service. In certain embodiments, the RAM disk is created by executing a RAM disk driver, which allocates a block of a volatile memory array of the system 100 as if the memory block were a physical storage. In other words, the RAM disk is formed by emulating a virtual storage using the block of the volatile memory array of the system 100. The storage emulated by the RAM disk may be any storage, such as memory cards, USB drives, hard drives, floppy disks, optical drives, or any other types of data storage devices.

Figure 5:
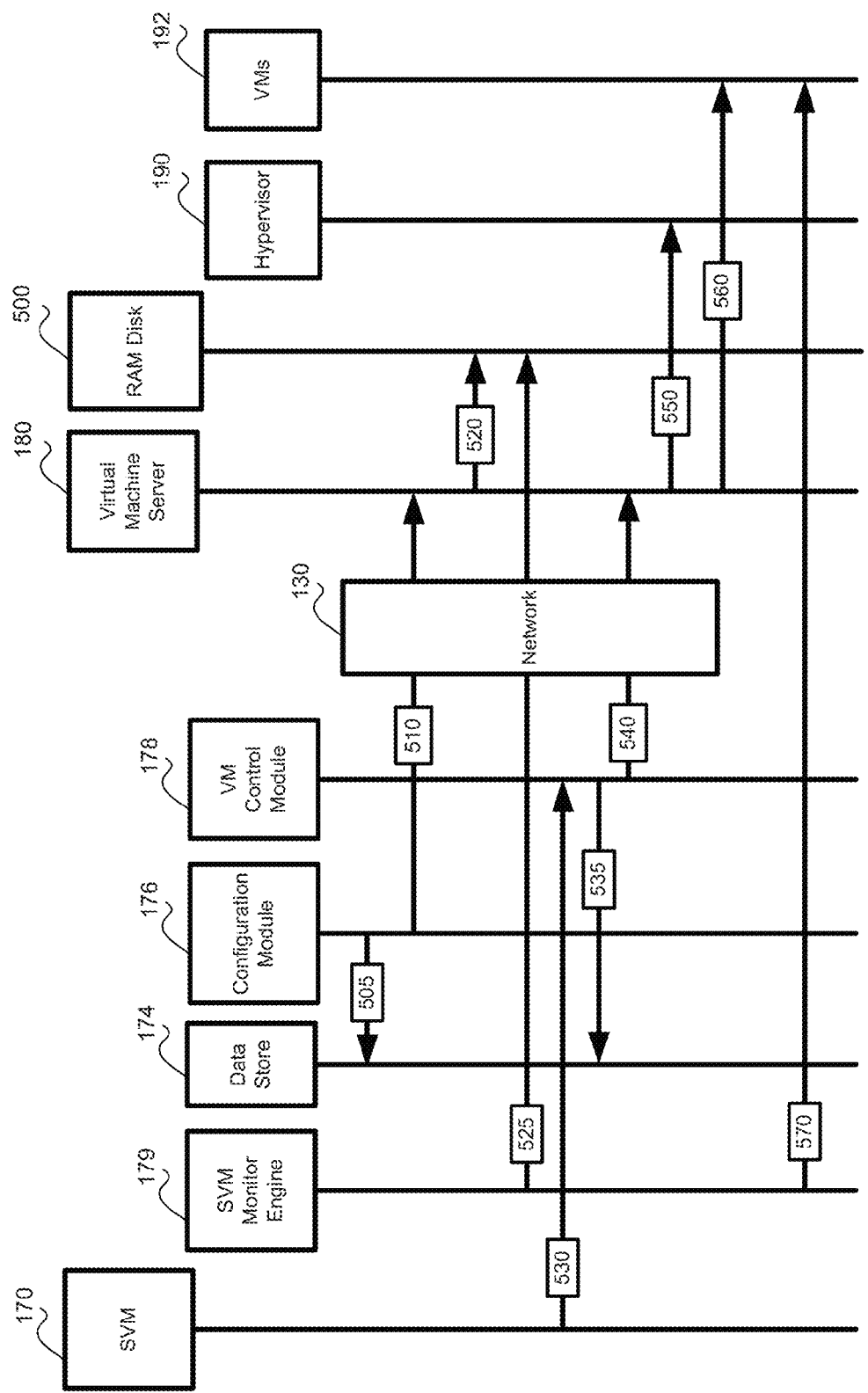
FIG. 5 schematically depicts the VM configuration using a RAM disk in a memory array according to certain embodiments of the present disclosure.

FIG. 5 schematically depicts the VM configuration using a RAM disk in a memory array according to certain embodiments of the present disclosure. In certain embodiments, the VM configuration is performed after the configuration of the virtual machine server 180 as shown in FIG. 3 and the configuration of the cluster as shown in FIG. 4. In this embodiment, the VM control module 178 and the configuration module 176 controls the virtual machine server 180 to execute the hypervisor 190, and to create VM images 192 in a RAM disk 500 using a volatile memory array.

At procedure 505, the configuration module 176 retrieves the RAM disk configuration information from the data store 174. Examples of the RAM disk configuration information may include, but not limited to, the storage and partition types of the RAM disk, the size of the RAM disk, and information of an assigned backup physical storage for the RAM disk.

At procedure 510, the configuration module 176 sends an instruction to the virtual machine server 180 to control the virtual machine server 180 to launch a RAM disk 500. In certain embodiments, the instruction may be formed based on the retrieved RAM disk configuration information from the data store 174. At procedure 520, the virtual machine server 180 launches the RAM disk 500 based on the instruction. In certain embodiments, the RAM disk is launched on a volatile memory array of the system 100 using a RAM disk driver. In certain embodiment, the RAM disk driver may be stored in the storage 186 of the virtual machine server 180.

Once the RAM disk 500 is launched, at procedure 525, the SVM monitor engine 179 starts monitoring the RAM disk 500, and generates corresponding monitoring information for the RAM disk 500. In certain embodiments, the monitoring information for the RAM disk 500 may include the status of the RAM disk. In certain embodiments, the SVM monitor engine 179 may control the UI module 175 to display the monitoring information for the RAM disk 500 to the user through the UI. If the SVM monitor engine 179 detects any error in the RAM disk 500, the UI module 175 may generate an error message related to the detected errors based on the monitoring information, and display the error message to the user through the UI. Thus, the user may determine the issues of the RAM disk 500 based on the error message, and perform corresponding solutions to resolve the issues.

Once the RAM disk 500 is set up, at procedure 530, the SVM 170 calls the VM control module 178 to start controlling the creation of the VMs 192. At procedure 535, the VM control module 178 retrieves the VM configuration information from the data store 174. At procedure 540, the configuration module 176 sends an instruction to the virtual machine server 180 to control the virtual machine server 180 to execute the hypervisor 190 and the VMs 192. In certain embodiments, the instruction is generated based on the VM configuration information.

At procedure 550, the virtual machine server 180 executes the hypervisor 190 based on the instruction. At procedure 560, the virtual machine server 180 deploys the VMs 192 to the RAM disk 500, and then executes the VMs on the executed hypervisor 190.

Once the VMs are executed, at procedure 570, the SVM monitor engine 179 starts monitoring each of the executed VMs, and generating corresponding monitoring information for the VMs. In certain embodiments, the monitoring information for each of the VMs may include the status of the VM. In certain embodiments, the SVM monitor engine 179 may control the UI module 175 to display the monitoring information for the VMs to the user through the UI. If the SVM monitor engine 179 detects any error in any of the VMs, the UI module 175 may generate an error message related to the detected errors based on the monitoring information, and display the error message to the user through the UI. Thus, the user may determine the issues of the VMs based on the error message, and perform corresponding solutions to resolve the issues.

In certain embodiments, the additional features related to the VMs of the system include HA failover features. For example, the system 100 may implement a HA failover feature where a cluster includes two identical virtual machine servers 180. One of the two identical virtual machine servers 180 serves as an active node, and the other of the two identical virtual machine servers 180 serves as a passive node. The virtual machine server 180 serving as the active node performs the VM related functions, and the virtual machine server 180 serving as the passive node functions as the backup server for the active node. When the SVM monitor engine 179 detects any error in the virtual machine server 180 serving as the active node, the SVM monitor engine 179 may perform the related HA failover features based on the HA failover configuration information to initiate the passive node, such that the passive node may continue providing VM services to the system 100. In this case, all of the running VMs will be migrated from the active node to the passive node. In certain embodiments, the SVM monitor engine 179 may also display the monitoring information related to the active node and the passive node such that the user is aware of the "owner" of the node of the executed VM.

In certain embodiments, the SVM 170 allows the user to configure the cluster quorum configuration and quorum vote. In this case, the user may operate the UI to determine how many nodes are supported in a cluster. For example, if the system has a plurality of node servers available, and the number of the node servers is an odd number (e.g., 3, 5, 7, etc.), the user may select a node majority quorum configuration as the quorum configuration. If the number of the node servers is an even number (e.g., 2, 4, 6, etc.), the user may select a node and disk majority quorum configuration as the quorum configuration.

In certain embodiments, the additional features related to the VMs of the system comprise alert features. For example, during the operation of the system 100, irregularity events may occur without generating an error. When the SVM monitor engine 179 detects such irregularity events within the system 100, the SVM monitor engine 179 may generate alert messages corresponding to the monitored value and the configured value based on the alert configuration information. In certain embodiments, the alert messages may be routed through an alerting service, which may be registered with a messaging framework of the system 100.

Figure 6:
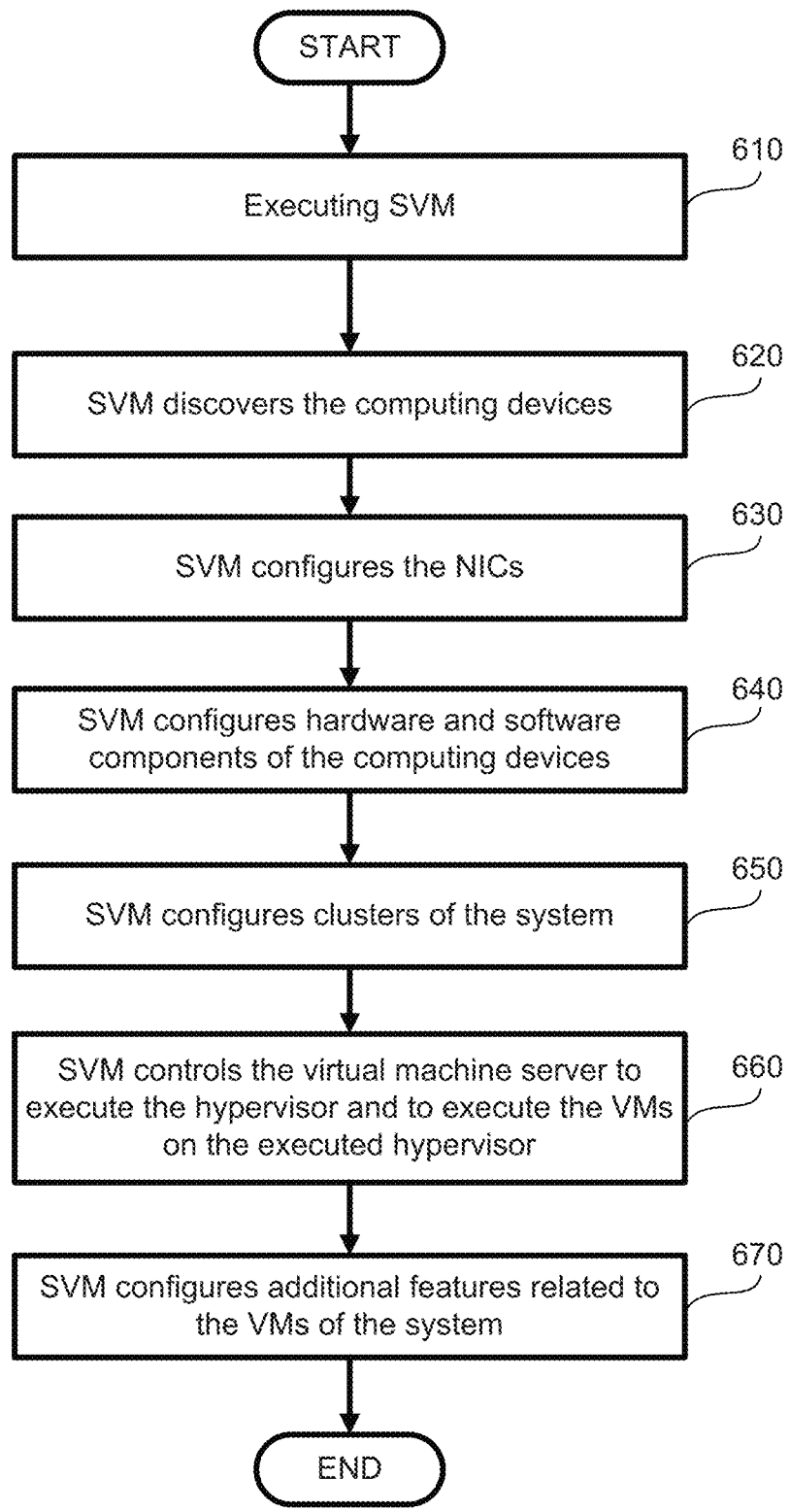
FIG. 6 depicts a flowchart showing a method of performing HA configuration and validation of VDI according to certain embodiments of the present disclosure.

A further aspect of the present disclosure is directed to a method of performing HA configuration and validation of VDI using a SVM with memory arrays. FIG. 6 depicts a flowchart showing a method of performing HA configuration and validation of VDI according to certain embodiments of the present disclosure. In certain embodiments, the method as shown in FIG. 6 is performed by the SVM, which may be implemented in a system 100 as shown in FIGS. 1 and 2A.

At procedure 610, the system executes the SVM to start performing the method. At procedure 620, the SVM performs discovery of the computing devices. At procedure 620, the SVM performs configuration of the NICs of the computing devices. At procedure 640, the SVM performs configuration of the hardware and software components of the computing devices. For example, the configuration of the hardware and software components of each of the computing devices 110 may include configuration of the processor 112, the memory 114, the storage 116, and the software components stored in the storage 116. In certain embodiments, the discovery and configurations of the computing devices may be performed with reference to FIG. 3.

At procedure 650, the SVM performs configuration of clusters of the system 100. In certain embodiments, the configuration of the clusters may be performed with reference to FIG. 4.

At procedure 660, the SVM controls the virtual machine server to execute the hypervisor and to execute the VMs on the executed hypervisor. In certain embodiments, the control of the virtual machine server may be performed with reference to FIG. 5.

At procedure 670, the SVM performs configuration of the additional features related to the VMs of the system 100. In certain embodiments, the additional features may include the HA failover features and the alert features.

Figure 7:
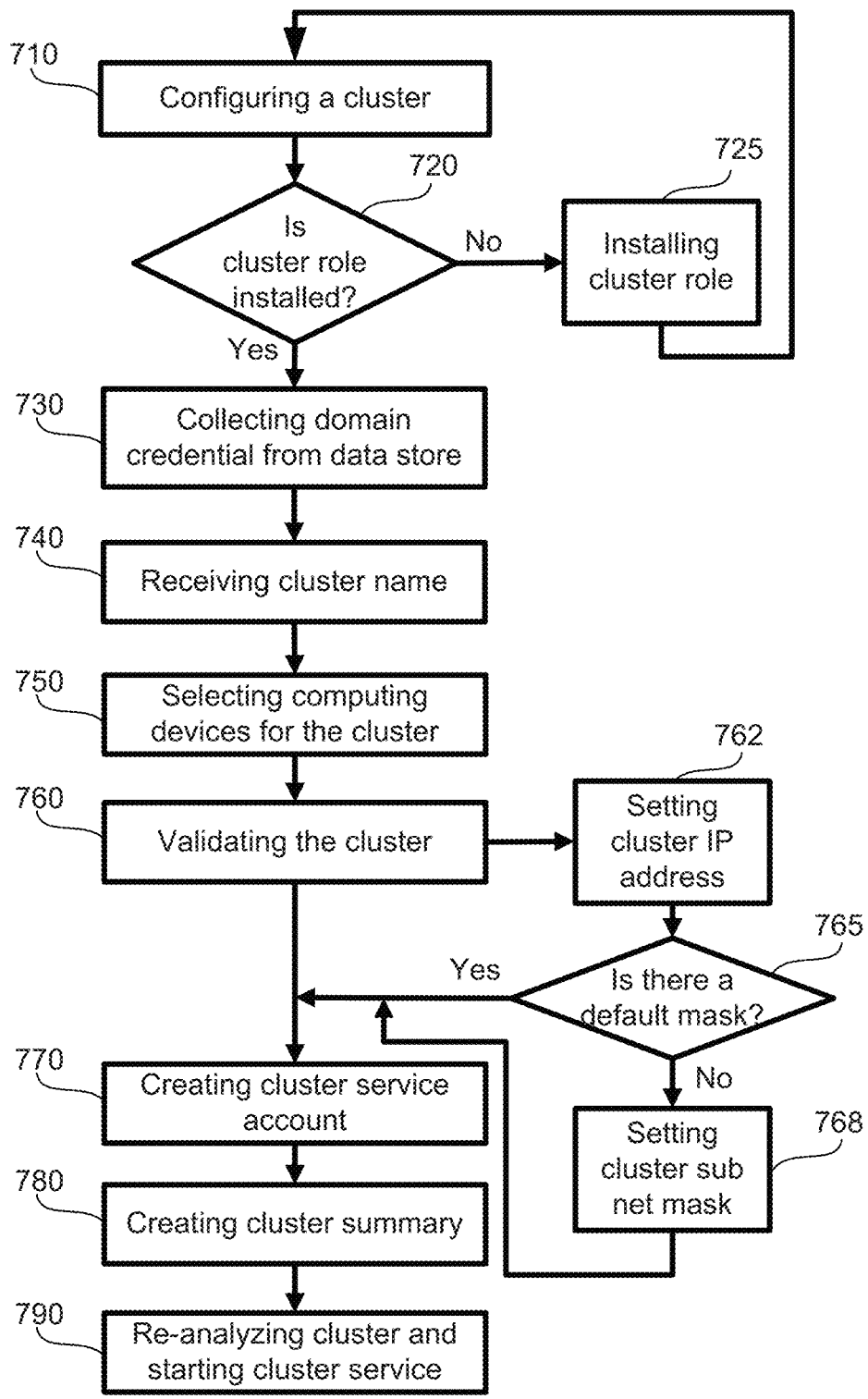
FIG. 7 schematically depicts the configuration and validation of a cluster by the SVM according to certain embodiments of the present disclosure.

FIG. 7 schematically depicts the configuration and validation of a cluster by the SVM according to certain embodiments of the present disclosure. Specifically, FIG. 7 provides more detailed validation procedures for validating the cluster.

At procedure 710, the configuration module 176 starts configuring a cluster. In certain embodiments, the configuration module 176 retrieves the cluster configuration information of the virtual machine servers 180 from the data store 174.

At procedure 720, the configuration module 176 determines, based on the retrieval of the cluster configuration information, whether the cluster role is installed or not. If the cluster role is not installed, at procedure 725, the configuration module 176 installs the cluster role. If the cluster role has been installed, the configuration module 176 moves to procedure 530.

At procedure 730, the configuration module 176 collects the domain credential from the cluster configuration information stored in the data store 174. At procedure 740, the configuration module 176 receives a cluster name. At procedure 750, the configuration module 176 selects the computing devices 110 for the cluster. Generally, the computing devices 110 selected for the cluster are of the same family and configuration such that the computing devices 110 may perform the same task.

At procedure 760, the configuration module 176 starts validating the cluster and then creating the cluster. At procedure 762, the configuration module 176 sets the cluster IP address. At procedure 765, the configuration module 176 determines if there is a default subnet mask for the cluster. If the default mask does not exist, at procedure 768, the configuration module 176 sets the cluster sub net mask.

At procedure 770, the configuration module 176 creates a cluster service account. At procedure 780, the configuration module 176 creates cluster summary for the cluster. Once the cluster summary is created, at procedure 790, the configuration module 176 re-analyzes the cluster and starts the cluster service.

In a further aspect, the present disclosure is related to a non-transitory computer readable medium storing computer executable code. The code, when executed at one or more processor of a computer device 100, may perform the method as described above. In certain embodiments, the non-transitory computer readable medium may include, but not limited to, any physical or virtual storage media. In certain embodiments, the non-transitory computer readable medium may be implemented as the non-volatile memory 126 of the virtual desktop controller 120 as shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for performing high availability (HA) configuration and validation of virtual desktop infrastructure (VDI), comprising:
   a plurality of computing devices, each of the computing devices comprises at least one network interface card (NIC); and
   a virtual desktop controller communicatively connected to the computing devices via a network and directly connected to a virtual machine server storing a hypervisor and a plurality of virtual machines (VMs), wherein the virtual machine server and the virtual desktop controller are two different and separate components and each comprise at least two NICs, wherein the virtual desktop controller comprises a processor, a memory, and a storage device storing computer executable code, wherein the code, when executed at the processor, is configured to:
      discover, by a discovery engine, the computing devices based on discovery information stored in a data store, thus yielding discovered computer devices;
      configure, by a configuration module, the NICs of the discovered computing devices;
      configure, by the configuration module, hardware and software components of the discovered computing devices;
      configure, by the configuration module, at least one cluster of the system, wherein each of the at least one cluster comprises at least one of the discovered computing devices;

execute, by a control module, the hypervisor and execute a plurality of virtual machines (VMs) on the executed hypervisor;

configure, by the configuration module, additional features related to the VMs of the system;

monitor, by a monitoring module, the hardware and software components of the discovered computing devices and generate corresponding monitoring information of the discovered computing devices, wherein the corresponding monitoring information comprises change of the hardware and software components; and display, by a user interface (UI) module, the corresponding monitoring information on a display device, thus performing high availability (HA) configuration and validation of the VDI;

wherein for each of the discovered computing devices, the discovery information comprises a protocol, a port number and an internet protocol (IP) address; and wherein the configuration module is configured to configure the NICs of the discovered computing devices by:

for each of the discovered computing devices comprising two or more of the NICs, performing NIC teaming to combine the two or more of the NICs to function as a single NIC.

2. The system as claimed in claim 1, wherein the at least one of the discovered computing devices is the virtual machine server storing the hypervisor and the plurality of VMs, wherein the virtual desktop controller is connected to the virtual machine server through an interface.

3. The system as claimed in claim 2, wherein
the data store stores information of the system, and wherein the information of the system comprises discovery information and cluster configuration information;

the discovery engine is configured to discover the computing devices based on the discovery information;

the configuration module is configured to configure the NICs and the hardware and software components of the discovered computing devices by the discovery engine, to configure the at least one cluster of the system based on the cluster configuration information, and to configure the additional features related to the VMs of the system;

the VM control module is configured to control the virtual machine server to execute the hypervisor and to execute the VMs on the executed hypervisor; and the SVM monitor engine is configured to monitor the hardware and software components of the discovered computing devices and generate corresponding monitoring information, and to register the discovery information into the data store based on the corresponding monitoring information.

4. The system as claimed in claim 3, wherein the configuration module is configured to configure each of the at least one cluster of the system by:

checking the data store for the cluster configuration information;

when the cluster configuration information is stored in the data store, determining that a cluster role is installed, and collecting a domain credential from the cluster configuration information stored in the data store, wherein the domain credential comprises an internet protocol (IP) address for the cluster;

receiving a cluster name for the cluster;

selecting the at least one of the discovered computing devices for the cluster; and validating the cluster.

5. The system as claimed in claim 4, wherein the configuration module is further configured to configure each of the at least one cluster of the system by:

when the cluster configuration information is not stored in the database, determining that the cluster role is not installed, and installing the cluster role to generate the cluster configuration information in the data store.

6. The system as claimed in claim 3, wherein the VM control module is configured to control the virtual machine server to execute the VMs on the executed hypervisor by:

launching a random access memory (RAM) disk on a volatile memory array using a RAM disk driver;

deploying the VMs to the RAM disk; and executing the VMs from the RAM disk.

7. The system as claimed in claim 6, wherein the SVM monitor engine is further configured to monitor the RAM disk.

8. The system as claimed in claim 1, wherein the at least one of the discovered computing devices is a thin client computing device.

9. The system as claimed in claim 1, wherein the additional features related to the VMs of the system comprise HA failover features.

10. The system as claimed in claim 1, wherein the additional features related to the VMs of the system comprise alert features.

11. A method of performing high availability (HA) configuration and validation of virtual desktop infrastructure (VDI), comprising:

discovering, by a discovery engine of a snap VDI manager (SVM) executed at a processor of a virtual desktop controller, a plurality of computing devices of a VDI system based on discovery information stored in a data store, thus yielding discovered computer devices, wherein the virtual desktop controller is communicatively connected to the discovered computing devices via a network and is directly connected to a virtual machine server storing a hypervisor and a plurality of virtual machines (VMs), wherein the virtual machine server and the virtual desktop controller are two different and separate components and each comprise at least two NICs, and wherein each of the discovered computing devices comprises at least one network interface card (NIC);

configuring, by a configuration module of the executed SVM, the NICs of the discovered computing devices;

configuring, by the configuration module of the executed SVM, hardware and software components of the discovered computing devices;

configuring, by the configuration module of the executed SVM, at least one cluster of the VDI system, wherein each of the at least one cluster comprises at least one of the discovered computing devices;

executing, by a control module of the executed SVM, the hypervisor and executing a plurality of virtual machines (VMs) on the executed hypervisor;

configuring, by the configuration module of the executed SVM, additional features related to the VMs of the VDI system;

monitoring, by a monitoring module, the hardware and software components of the discovered computing devices and generating corresponding monitoring information of the discovered computing devices, wherein the corresponding monitoring information comprises change of the hardware and software components; and displaying, by a user interface (UI) module, the corresponding monitoring information on a display device, thus performing high availability (HA) configuration and validation of the VDI;

wherein for each of the discovered computing devices, the discovery information comprises a protocol, a port number and an internet protocol (IP) address; and wherein the configuration module is configured to configure the NICs of the discovered computing devices by:

for each of the discovered computing devices comprising two or more of the NICs, performing NIC teaming to combine the two or more of the NICs to function as a single NIC.

12. The method as claimed in claim 11, wherein at least the one of the discovered computing devices is the virtual machine server storing the hypervisor and the plurality of VMs, wherein the virtual desktop controller is connected to the virtual machine server through an interface.

13. The method as claimed in claim 12, wherein the data store stores information of the VDI system, wherein the information of the VDI system comprises discovery information and cluster configuration information;

the discovery engine is configured to discover the computing devices based on the discovery information;

the configuration module is configured to configure the NICs and the hardware and software components of the discovered computing devices being discovered by the discovery engine, to configure the at least one cluster of the system based on the cluster configuration information, and to configure the additional features related to the VMs of the VDI system;

the VM control module is configured to control the virtual machine server to execute the hypervisor and to execute the VMs on the executed hypervisor; and the SVM monitor engine is configured to monitor the hardware and software components of the discovered computing devices and generate corresponding monitoring information, and to register the discovery information into the data store based on the corresponding monitoring information.

14. The method as claimed in claim 13, wherein the configuration module is configured to configure each of the at least one cluster of the VDI system by:

checking the data store for the cluster configuration information;

when the cluster configuration information is stored in the data store, determining that a cluster role is installed, and collecting a domain credential from the cluster configuration information stored in the data store, wherein the domain credential comprises an internet protocol (IP) address for the cluster;

receiving a cluster name for the cluster;

selecting the at least one of the discovered computing devices for the cluster; and validating the cluster.

15. The method as claimed in claim 14, wherein the configuration module is further configured to configure each of the at least one cluster of the VDI system by:

when the cluster configuration information is not stored in the database, determining that the cluster role is not installed, and installing the cluster role to generate the cluster configuration information in the data store.

16. The method as claimed in claim 13, wherein the VM control module is configured to control the virtual machine server to execute the VMs on the executed hypervisor by:

launching a random access memory (RAM) disk on a volatile memory array using a RAM disk driver;

deploying the VMs to the RAM disk; and executing the VMs from the RAM disk.

17. The method as claimed in claim 16, wherein the SVM monitor engine is further configured to monitor the RAM disk.

18. The method as claimed in claim 11, wherein the additional features related to the VMs of the system comprise HA failover features and alert features.

19. A non-transitory computer readable medium storing computer executable codes, wherein the codes, when executed at a processor of a virtual desktop controller, are configured to:

discover, by a discovery engine, a plurality of computing devices of a virtual desktop infrastructure (VDI) system based on discovery information stored in a data store, thus yielding discovered computing devices, wherein the virtual desktop controller is communicatively connected to the discovered computing devices via a network and is directly connected to a virtual machine server storing a hypervisor and a plurality of virtual machines (VMs), wherein the virtual machine server and the virtual desktop controller are two different and separate components and each comprise at least two network interface cards (NICs), and wherein each of the discovered computing devices comprises at least one NIC;

configure, by a configuration module, the NICs of the discovered computing devices;

configure, by the configuration module, hardware and software components of the discovered computing devices;

configure, by the configuration module, at least one cluster of the VDI system, wherein each of the at least one cluster comprises at least one of the discovered computing devices;

execute, by a control module, the hypervisor and execute a plurality of virtual machines (VMs) on the executed hypervisor;

configure, by the configuration module, additional features related to the VMs of the VDI system;

monitor, by a monitoring module, the hardware and software components of the discovered computing devices and generate corresponding monitoring information of the discovered computing devices, wherein the corresponding monitoring information comprises change of the hardware and software components; and display, by a user interface (UI) module, the corresponding monitoring information on a display device, thus performing high availability (HA) configuration and validation of the VDI;

wherein for each of the discovered computing devices, the discovery information comprises a protocol, a port number and an internet protocol (IP) address; and wherein the configuration module is configured to configure the NICs of the discovered computing devices by:

for each of the discovered computing devices comprising two or more of the NICs, performing NIC teaming to combine the two or more of the NICs to function as a single NIC.

20. The non-transitory computer readable medium as claimed in claim 19, wherein the at least one of the discovered computing devices is the virtual media server storing the hypervisor and the plurality of VMs, wherein the virtual desktop controller is connected to the virtual machine server through an interface.

21. The non-transitory computer readable medium as claimed in claim 20, wherein
the data store stores information of the VDI system, and wherein the information of the VDI system comprises discovery information and cluster configuration information;
the discovery engine is configured to discover the computing devices based on the discovery information;
the configuration module is configured to configure the NICs and the hardware and software components of the discovered computing devices being discovered by the discovery engine, to configure the at least one cluster of the VDI system based on the cluster configuration information, and to configure the additional features related to the VMs of the VDI system;
the VM control module is configured to control the virtual machine server to execute the hypervisor and to execute the VMs on the executed hypervisor; and
the SVM monitor engine is configured to monitor the hardware and software components of the discovered computing devices and generate corresponding monitoring information, and to register the discovery information into the data store based on the corresponding monitoring information.

22. The non-transitory computer readable medium as claimed in claim 21, wherein the configuration module is configured to configure each of the at least one cluster of the VDI system by:
checking the data store for the cluster configuration information;
when the cluster configuration information is stored in the data store, determining that a cluster role is installed, and collecting a domain credential from the cluster configuration information stored in the data store, wherein the domain credential comprises an internet protocol (IP) address for the cluster;
receiving a cluster name for the cluster;
selecting the at least one of the discovered computing devices for the cluster; and
validating the cluster.

23. The non-transitory computer readable medium as claimed in claim 22, wherein the configuration module is further configured to configure each of the at least one cluster of the VDI system by:
when the cluster configuration information is not stored in the database, determining that the cluster role is not installed, and installing the cluster role to generate the cluster configuration information in the data store.

24. The non-transitory computer readable medium as claimed in claim 21, wherein the VM control module is configured to control the virtual machine server to execute the VMs on the executed hypervisor by:
launching a random access memory (RAM) disk on a volatile memory array using a RAM disk driver;
deploying the VMs to the RAM disk; and
executing the VMs from the RAM disk.

25. The non-transitory computer readable medium as claimed in claim 24, wherein the SVM monitor engine is further configured to monitor the RAM disk.

26. The non-transitory computer readable medium as claimed in claim 19, wherein the additional features related to the VMs of the system comprise high availability (HA) failover features and alert features.

* * * * *